(12) United States Patent
Urano

(10) Patent No.: US 8,513,835 B2
(45) Date of Patent: Aug. 20, 2013

(54) WIRELESS POWER FEEDER AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 694 days.

(21) Appl. No.: 12/898,143

(22) Filed: Oct. 5, 2010

(65) Prior Publication Data

US 2011/0080053 A1 Apr. 7, 2011

(30) Foreign Application Priority Data

Oct. 5, 2009 (JP) ................................ 2009-231885
Jul. 2, 2010 (JP) ................................ 2010-151648

(51) Int. Cl.
*H01F 27/42* (2006.01)

(52) U.S. Cl.
USPC ......................................................... 307/104

(58) Field of Classification Search
USPC ......................................................... 307/104
See application file for complete search history.

(56) References Cited

U.S. PATENT DOCUMENTS

2007/0222542 A1 9/2007 Joannopoulos et al.
2008/0278264 A1 11/2008 Karalis et al.
2009/0072629 A1 3/2009 Cook et al.

FOREIGN PATENT DOCUMENTS

JP 2006-230032 8/2006
WO WO 2006/022365 A1 3/2006

OTHER PUBLICATIONS

Fu et al., "Study on Frequency-tracking Wireless Power Transfer System by Resonant Coupling", The World of Inventors, Aug. 2009, pp. 46-46.
Translation of Chinese Office Action issued in Chinese Application No. 201010502126.0 mailed Dec. 19, 2012.
Translation of Chinese Search Report issued in Chinese Application No. 201010502126.0 mailed Dec. 12, 2012.
Fu et al., "Study on Frequency-tracking Wireless Power Transfer System by Resonant Coupling", Power Electronics and Motion Control Conference, 2009. IPEMC '09. IEEE 6th International , May 17-20, 2009, pp. 2658-2663.

*Primary Examiner* — Robert L. Deberadinis
(74) *Attorney, Agent, or Firm* — McDermott Will & Emery LLP

(57) ABSTRACT

Power is transmitted from a feeding coil L2 to a receiving coil L3 by magnetic resonance. A VCO 202 alternately turns ON/OFF switching transistors Q1 and Q2 to feed AC current to the feeding coil L2, whereby the AC power is fed from the feeding coil L2 to the receiving coil L3. An AC magnetic field generated by AC current IS flowing in the feeding coil L2 causes inductive current ISS to flow in a detection coil LSS. A phase detection circuit 150 compares the phase of AC voltage generated by the VCO 202 and phase of the inductive current ISS to detect the phase difference between voltage and current phases and generates phase difference indicating voltage indicating the magnitude of the phase difference. The reset circuit 102 forcibly reduces the phase difference indicating voltage when the phase difference indicating voltage exceeds a predetermined threshold.

15 Claims, 11 Drawing Sheets

WIRELESS POWER FEEDER AND WIRELESS POWER TRANSMISSION SYSTEM

BACKGROUND OF THE INVENTION

1. Field of the Invention

The present invention relates to a wireless power feeder for feeding power by wireless and a wireless power transmission system.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load R connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1] U.S. Pat. Appln. Publication No. 2008-0278246

[Patent Document 2] Jpn. Pat. Appln. Laid-Open Publication No. 2006-230032

[Patent Document 3] International Publication Pamphlet No. WO2006-022365

[Patent Document 4] U.S. Pat. Appln. Publication No. 2009-0072629

In order to generate magnetic field resonance phenomenon, the drive frequency of an AC power supply needs to be made to coincide with the resonance frequency when AC power is fed to the exciting coil or feeding coil. The present inventor has reached to a method that compares a voltage waveform and a current waveform and allows the drive frequency to track the resonance frequency based on the phase difference between the voltage waveform and current waveform. However, it has been found that when these waveforms are temporarily distorted by an external factor, the drive frequency is changed to an extreme value and this extreme value can be maintained.

SUMMARY

The present invention has been made in view of the above problem, and a main object thereof is to allow the drive frequency to track the resonance frequency adequately in a wireless power feeding technique of a magnetic field resonance type.

A wireless power feeder according to a first aspect of the present invention is a device for feeding power by wireless from a feeding coil to a receiving coil at the resonance frequency of the feeding coil and the receiving coil. The wireless power feeder includes: a power transmission control circuit; a feeding coil; an exciting coil that is magnetically coupled to the feeding coil and feeds AC power fed from the power transmission control circuit to the feeding coil; a phase detection circuit that detects the phase difference between the voltage phase and current phase of the AC power and generates a phase difference indicating voltage in accordance with the magnitude of the phase difference; and a reset circuit that is connected to a voltage line to which the phase difference indicating voltage is fed so as to reduce the phase difference indicating voltage. The transmission power control circuit includes first and second current paths and makes first and second switches connected in series respectively to the first and second current paths alternately conductive to feed the AC power to the exciting coil. The phase difference indicating voltage output from the phase detection circuit is input to the power transmission control circuit. The power transmission control circuit adjusts the drive frequency so as to reduce the phase difference according to the phase difference indicating voltage to allow the drive frequency to track the resonance frequency. The reset circuit reduces the phase difference indicating voltage when the phase difference indicating voltage exceeds a predetermined threshold.

A wireless power feeder according to a second aspect of the present invention is a device for feeding power by wireless from a feeding coil to a receiving coil at the resonance frequency of the feeding coil and the receiving coil. The wireless power feeder includes: a power transmission control circuit that feeds AC power to the feeding coil at the drive frequency; a feeding coil circuit that includes the feeding coil and a capacitor and resonate at the resonance frequency; a phase detection circuit that detects the phase difference between the voltage phase and the current phase of the AC power and generates a phase difference indicating voltage in accordance with the magnitude of the phase difference; and a reset circuit that is connected to a voltage line to which the phase difference indicating voltage is fed so as to reduce the phase difference indicating voltage. The power transmission control circuit includes first and second current paths and makes first and second switches connected in series respectively to the first and second current paths alternately conductive to feed the AC power to the feeding coil. The phase difference indicating voltage output from the phase detection circuit is input to the power transmission control circuit. The power transmission control circuit adjusts the drive frequency so as to reduce the phase difference according to the phase difference indicating voltage to allow the drive frequency to track the resonance frequency. The reset circuit reduces the phase difference indicating voltage when the phase difference indicating voltage exceeds a predetermined threshold.

When the drive frequency of the power transmission circuit and the resonance frequency are made coincide with each other, the power transmission efficiency in the entire system is enhanced. The current and voltage phases of the AC power are compared to detect the phase difference between them, and the drive frequency is adjusted so as to reduce the detected phase difference, whereby it is possible to allow the drive frequency to track the resonance frequency. As a result, the power transmission efficiency can be kept at a high level.

The phase difference is indicated by the phase difference indicating voltage. The reset circuit can forcibly reduce the phase difference indicating voltage, so that even if the phase difference indicating voltage is locked to a high value based on an external factor, this locked state can automatically be released. As a result, operation stability of the system is enhanced. The higher the phase difference indicating voltage, the further the power transmission control circuit may increase the drive frequency. In this case, even if a situation where the drive frequency is locked to a significantly higher value than the resonance frequency occurs, this situation can easily be automatically solved by the reset circuit.

A bypass path may be connected to a voltage line extending from the phase detection circuit to power transmission control circuit. The reset circuit may make a switch inserted in the bypass path conductive to reduce the phase difference indicating voltage. A low-pass filter may be connected to the output end of the phase detection circuit. The low-pass filter may be a circuit in which a resistor and a capacitor are connected in series to each other. The reset circuit may be connected to a voltage line drawn from the intermediate point between the resistor and capacitor.

The wireless power feeder may further include a detection coil that generates inductive current based on a magnetic field generated by the AC current. The phase detection circuit measures the phase of the inductive current flowing in the detection coil to specify the current phase of the AC power.

A magnetic field generated by the AC current causes the detection coil to generate inductive current, and the current phase is measured from the inductive current, so that a measurement load is not directly applied to the feeding coil. Thus, it is possible to monitor whether a resonance state is maintained by detecting the phase difference between the voltage phase and the current phase while suppressing influence on the resonance characteristics of the feeding coil. The detection coil may generate the inductive current based on a magnetic field generated by the AC current flowing in the feeding coil.

A wireless power transmission system according to the present invention includes: the wireless power feeder described above, a receiving coil; and a loading coil that is magnetically coupled to the receiving coil and receives power that the receiving coil has received from the feeding coil.

It is to be noted that any arbitrary combination of the above-described structural components and expressions changed between a method, an apparatus, a system, etc. are all effective as and encompassed by the present embodiments.

The present invention makes it easy to allow the drive frequency to track the resonance frequency more reliably in wireless power feeding of a magnetic field resonance type.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings. A half-bridge type will first be described as a first embodiment and then a push-pull type will be described as a second embodiment. Description common to the first embodiment and the second embodiment is referred to as a "present embodiment".

First Embodiment

Half-Bridge Type

Figure 1:
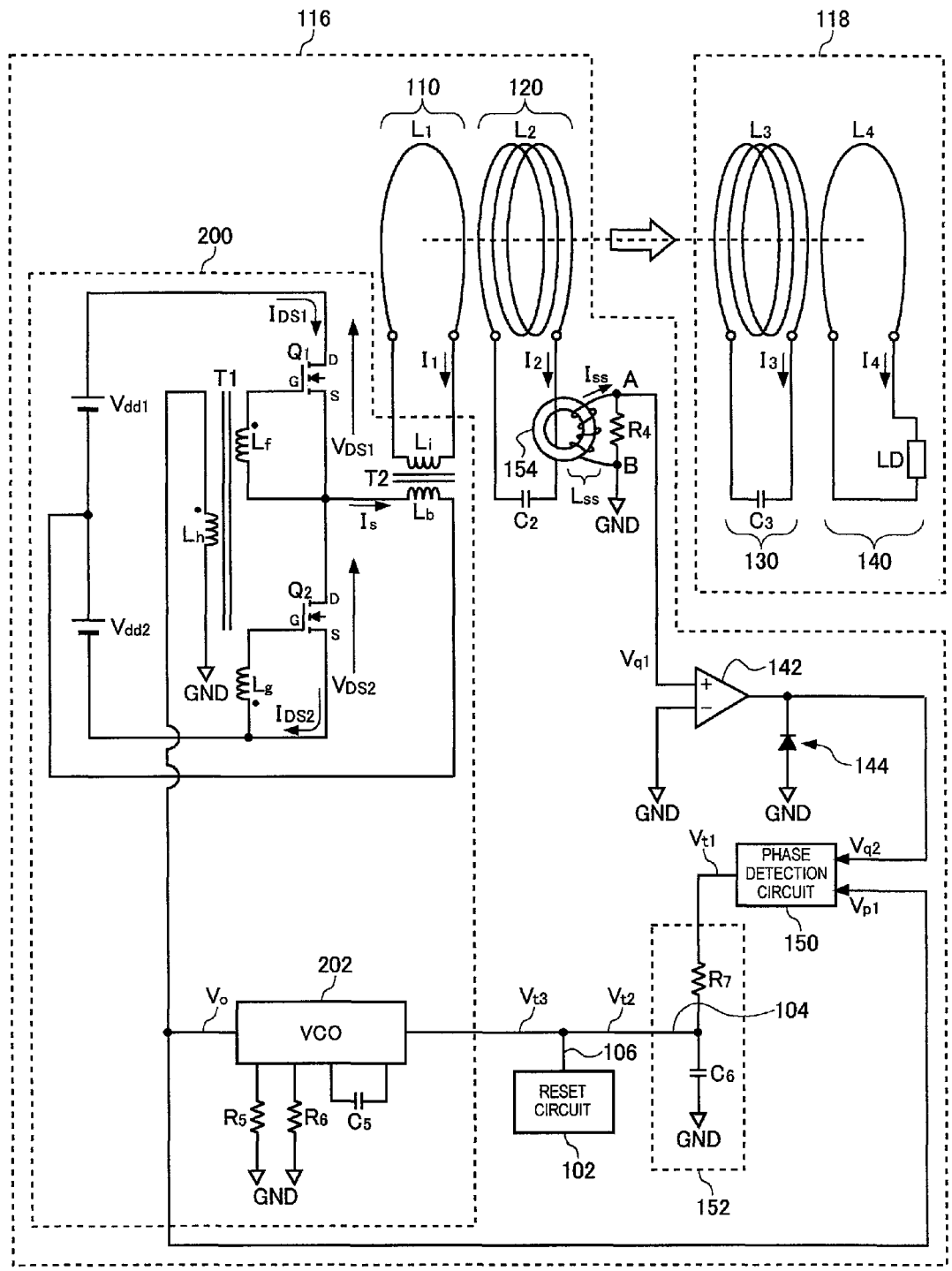
FIG. 1 is a system configuration view of a wireless power transmission system according to a first embodiment.

FIG. 1 is a system configuration view of a wireless power transmission system 100 according to the first embodiment. The wireless power transmission system 100 includes a wireless power feeder 116 and a wireless power receiver 118. The wireless power feeder 116 includes, as basic components, a power transmission control circuit 200, an exciting circuit 110, and a feeding coil circuit 120. The wireless power receiver 118 includes a receiving coil circuit 130, and a loading circuit 140.

A distance of several meters is provided between a feeding coil L2 of the feeding coil circuit 120 and a receiving coil L3 of the receiving coil circuit 130. The wireless power transmission system 100 mainly aims to feed AC power from the feeding coil L2 to receiving coil L3 by wireless. The wireless power transmission system according to the present embodiment is assumed to operate at a resonance frequency fr of 100 kHz or less. In the present embodiment, a resonance frequency fr is set to 44 kHz. Note that the wireless power transmission system according to the present embodiment can operate in a high-frequency band such as ISM (Industry-Science-Medical) frequency band.

The exciting circuit 110 is a circuit in which an exciting coil L1 and a transformer T2 secondary coil Li are connected in series. The transformer T2 secondary coil Li constitutes a coupling transformer T2 together with a transformer T2 primary coil Lb and receives AC power from the power transmission control circuit 200 by electromagnetic induction. The number of windings of the exciting coil L1 is 1, cross-sectional shape of a coil conductor thereof is a rectangle of 0.6 mm×6.0 mm, and shape of the exciting coil L1 itself is a square of 210 mm×210 mm. In FIG. 1, the exciting coil L1 is represented by a circle for clarification. Other coils are also represented by circles for the same reason. All the coils illustrated in FIG. 1 are made of copper. Current I1 flowing in the exciting circuit 110 is AC. The direction of an arrow in the diagram of the exciting circuit 110 indicates the positive direction, and direction opposite to the direction of the arrow indicates the negative direction.

The feeding coil circuit 120 is a circuit in which a feeding coil L2 and a capacitor C2 are connected in series. The exciting coil L1 and feeding coil L2 face each other. The distance between the exciting coil L1 and feeding coil L2 is as comparatively small as 10 mm or less. Thus, the exciting coil L1 and feeding coil L2 are electromagnetically strongly coupled to each other. The number of windings of the feeding coil L2 is 7, cross-sectional shape of a coil conductor thereof is a rectangle of 0.6 mm×6.0 mm, and shape of the feeding coil L2 itself is a square of 280 mm×280 mm. When the AC current I1 is made to flow in the exciting coil L1, an electromotive force occurs in the feeding coil L2 according to the principle of electromagnetic induction to cause AC current I2 to flow in the feeding coil circuit 120. The AC current I2 is considerably larger than the AC current I1. The values of the feeding coil L2 and capacitor C2 are set such that the resonance frequency fr of the feeding coil circuit 120 is 44 kHz.

The receiving coil circuit 130 is a circuit in which a receiving coil L3 and a capacitor C3 are connected in series. The feeding coil L2 and receiving coil L3 face each other. The distance between the feeding coil L2 and receiving coil L3 is as comparatively large as about 0.2 m to 1 m. The number of windings of the receiving coil L3 is 7, cross-sectional shape of a coil conductor thereof is a rectangle of 0.6 mm×6.0 mm, and shape of the receiving coil L3 itself is a square of 280 mm×280 mm. The values of the receiving coil L3 and capacitor C3 are set such that the resonance frequency fr of the receiving coil circuit 130 is also 44 kHz. Thus, the feeding coil L2 and receiving coil L3 need not have the same shape. When the feeding coil L2 generates a magnetic field at the resonance frequency fr, the feeding coil L2 and receiving coil L3 magnetically resonate, causing large current I3 to flow in the receiving coil circuit 130. The direction of an arrow in the diagram of the receiving coil circuit 130 indicates the positive direction, and direction opposite to the direction of the arrow indicates the negative direction. The flowing directions of the current I2 and current I3 are opposite (having opposite phases).

The loading circuit 140 is a circuit in which a loading coil L4 and a load LD are connected in series. The receiving coil L3 and loading coil L4 face each other. The distance between the receiving coil L3 and loading coil L4 is as comparatively small as about 10 mm or less. Thus, the receiving coil L3 and loading coil L4 are electromagnetically strongly coupled to each other. The number of windings of the loading coil L4 is 1, cross-sectional shape of a coil conductor thereof is a rectangle of 0.6 mm×6.0 mm, and shape of the loading coil L4 itself is a square of 300 mm×300 mm. When the current I3 is made to flow in the receiving coil L3, an electromotive force occurs in the loading circuit 140 to cause current I4 to flow in the loading circuit 140. The direction of an arrow in the diagram of the loading circuit 140 indicates the positive direction, and direction opposite to the direction of the arrow indicates the negative direction. The flowing directions of the current I3 and current I4 are opposite (having opposite phases). That is, the current I2 and current I4 are in-phase. The AC power fed from the feeding coil L2 of the wireless power feeder 116 is received by the receiving coil L3 of the wireless power receiver 118 and taken from the load LD.

If the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance the power transmission efficiency, the center lines of the feeding coil L2, receiving coil L3, and loading coil L4 are preferably made to coincide with one another.

A configuration of the power transmission control circuit 200 will be described. A VCO (Voltage Controlled Oscillator) 202 is connected to the primary side of the gate-drive transformer T1. The VCO 202 functions as an "oscillator" that generates AC voltage Vo at the drive frequency fo. Although the waveform of the AC voltage Vo may be a sine wave, it is assumed here that the voltage waveform is a rectangular wave. The AC voltage Vo causes current to flow in a transformer T1 primary coil Lh alternately in both positive and negative directions. A transformer T1 primary coil Lh, a transformer T1 secondary coil Lf, and a transformer T1 secondary coil Lg constitute a gate-drive coupling transformer T1. Electromagnetic induction causes current to flow also in the transformer T1 secondary coil Lf and transformer T1 secondary coil Lg alternately in both positive and negative directions.

As the VCO 202 in the present embodiment, a built-in unit (product serial number MC14046B) manufactured by Motorola, Inc is used. The VCO 202 also has a function of dynamically changing the drive frequency fo based on phase difference indicating voltages Vt1 to Vt3 fed from the phase detection circuit 150. Although the details will be described later, the VCO 202 also functions as a "drive frequency tracking circuit".

An 11th pin and a 12th pin of the VCO 202 are connected to the ground through a resistor R5 and resistor R6, respectively. Further, a 6th pin and a 7th pin of the VCO 202 are connected to each other through a capacitor C5. By adequately setting the values of the resistors R5, R6, and capacitor C5, it is possible to adjust the changeable range of the drive frequency fo. The drive frequency fo in the present embodiment is assumed to be adjusted in a range of 30 to 50 kHz. The adequate range of the phase difference indicating voltage Vt3 is 1 to 4 (V). The higher the phase difference indicating voltage Vt3, the higher the drive frequency fo becomes. The details will be described later using FIG. 4.

One end of the transformer T1 secondary coil Lf is connected to the gate of a switching transistor Q1, and the other end of the transformer T1 secondary coil Lf is connected to the source of a switching transistor Q1. One end of the transformer T1 secondary coil Lg is connected to the gate of a switching transistor Q2, and the other end of the transformer T1 secondary coil Lg is connected to the source of a switching transistor Q2. When the oscillator 202 generates AC voltage Vo of the drive frequency fo, voltage Vx (Vx>0) of the drive frequency fo is applied alternately to the gates of the switching transistors Q1 and Q2. As a result, the switching transistors Q1 and Q2 are alternately turned on/off at the drive frequency fo. The switching transistors Q1 and Q2 are enhancement type MOSFET (Metal Oxide Semiconductor Field effect transistor) having the same characteristics but may be other transistors such as a bipolar transistor. Further, other switches such as a relay switch may be used in place of the transistor.

The drain of the switching transistor Q1 is connected to the positive electrode of a power supply Vdd1. The negative electrode of the power supply Vdd1 is connected to the source of the switching transistor Q1 via the transformer T2 primary coil Lb. The negative electrode of the power supply Vdd1 is connected to the ground. The source of the switching transistor Q2 is connected to the negative electrode of the power supply Vdd2. The positive electrode of the power supply Vdd2 is connected to the drain of the switching transistor Q2 via the transformer T2 primary coil Lb. The positive electrode of the power supply Vdd2 is connected to the ground.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDS1, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") at this time starts from the power supply Vdd1 through the switching transistor Q1, transformer T2 primary coil Lb to return. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") at this time starts from the power supply Vdd2 through the transformer T2 primary coil Lb and the switching transistor Q2 to return. The switching transistor Q2 functions as a switch for controlling conduction/non-conduction of the second current path.

Current flowing in the transformer T2 primary coil Lb in the power transmission control circuit 200 is referred to as "current IS". The current IS is AC current, and the current flow in a first current path is defined as the positive direction and current flow in a second current path is defined as the negative direction.

When the VCO 202 feeds the AC voltage Vo at the drive frequency fo equal to the resonance frequency fr, the first and second current paths are switched at the resonance frequency fr. Since the AC current IS of the resonance frequency fr flows in the transformer T2 primary coil Lb, the AC current I1 flows in the exciting circuit 110 at the resonance frequency fr, and the AC current I2 of the resonance frequency fr flows in the feeding coil circuit 120. Thus, the feeding coil L2 and capacitor C2 of the feeding coil circuit 120 are in a resonance state.

The receiving coil circuit 130 is also a resonance circuit of the resonance frequency fr, so that the feeding coil L2 and receiving coil L3 magnetically resonate. At this time, the maximum transmission efficiency can be obtained.

The resonance frequency fr slightly changes depending on use condition or use environment of the feeding coil circuit 120 or receiving coil circuit 130. Further, in the case where the feeding coil circuit 120 or receiving coil circuit 130 is replaced with new one, the resonance frequency fr changes. Alternatively, there may be case where the resonance frequency needs to be changed aggressively by setting the electrostatic capacitance of the capacitor C2 or capacitor C3 variable. Even in such a case, the wireless power transmission system 300 can make the drive frequency fo and resonance frequency fr to automatically coincide with each other.

In order to make the drive frequency fo to track the resonance frequency fr, the following configuration is added. First, a phase detection circuit 150 is provided. As the phase detection circuit 150 in the present embodiment, a built-in unit (Phase Comparator) (product serial number MC14046B) manufactured by Motorola, Inc is used, as in the case of the VCO 202. Therefore, the phase detection circuit 150 and VCO 202 can be implemented in one chip. The phase detection circuit 150 detects the phase difference between two voltage waveforms and generates a phase difference indicating voltage Vt1 that indicates the magnitude of the phase difference. One of two inputs of the phase detection circuit 150 is the AC voltage Vo generated by the VCO 202. The phase detection circuit 150 acquires a voltage waveform by receiving the AC voltage Vo.

A resistor may be connected in parallel to both ends of the transformer T1 primary coil Lh to divide the AC voltage Vo for input to the phase detection circuit 150. Even in the case where the AC voltage Vo generated by the VCO 202 is high, the AC voltage Vo can be reduced to a manageable level by the voltage division. The voltage phase may be measured from source-drain voltage VDS1, source-drain voltage VDS2, source-gate voltage VGS1, or source-gate voltage VGS2.

A detection coil LSS is provided near the feeding coil L2. The detection coil LSS is a coil wounded around a core 154 (toroidal core) having a penetration hole NS times. The core 154 is formed of a known material such as ferrite, silicon steel, or permalloy. The number of windings NS of the detection coil LSS in the present embodiment is 100.

A part of the current path of the feeding coil circuit 120 penetrates the penetration hole of the core 154. This means that the number of windings NP of the feeding coil circuit 120 with respect to the core 154 is one. With the above configuration, the detection coil LSS and feeding coil L2 constitute a coupling transformer. An AC magnetic field generated by the AC current I2 of the feeding coil L2 causes inductive current ISS having the same phase as that of the current I2 to flow in the detection coil LSS. The magnitude of the inductive current ISS is represented by I2·(NP/NS) according to the law of equal ampere-turn.

A resistor R4 is connected to both ends of the detection coil LSS. One end B of the resistor R4 is grounded, and the other end A thereof is connected to the phase detection circuit 150 through a comparator 142.

Potential Vq1 is digitized by the comparator 142. Although details will be described later with regard to FIG. 2, the comparator 142 is an amplifier that outputs a saturated voltage Vq2=5 (V) when the potential Vq1 exceeds a predetermined threshold, e.g., 0.1 (V). Thus, the potential Vq1 of an analog waveform is converted to the voltage Vq2 of a digital waveform by the comparator 142. A negative component of the saturated voltage Vq2 is cut by a diode 144. In the case where the AC voltage Vo of not a rectangular wave but an analog waveform such as a sine wave needs to be generated, a comparator is inserted to the path from the VCO 202 to phase detection circuit 150.

The phase detection circuit 150 measures the current phase of the AC power based on the voltage waveform (digital waveform) of the voltage Vq2. The current I2 and inductive current ISS have the same phase, and the inductive current ISS and voltage Vq2 (potential Vq1) have the same phase. The AC current IS flowing in the power transmission control circuit 200 has the same phase as that of the current I2, so that the current waveform can be measured from the voltage waveform of the voltage Vq2. The phase detection circuit 150 acquires the voltage phase from the voltage waveform of the AC voltage Vo as Vp1 and current phase from the voltage waveform of the voltage Vq2 to thereby detect a phase difference td between the voltage phase and current phase. When the drive frequency fo coincides with the resonance frequency fr, the phase difference td is 0. The phase detection circuit 150 outputs the phase difference indicating voltage Vt1 in accordance with the phase difference td.

A low-pass filter 152 is connected to the output end of the phase detection circuit 150. The low-pass filter 152 is a circuit in which a resistor R7 and a capacitor C6 are connected in series and cuts a high-frequency component of the phase difference indicating voltage Vt1. Phase difference indicating voltage Vt2 in which the high-frequency component has been cut is taken from the resistor R7 and capacitor C6.

In general, the phase difference indicating voltage Vt2 becomes input voltage Vt3 input to the VCO 202. The VCO 202 changes the drive frequency fo in accordance with phase difference indicating voltage Vt3 to thereby allow the drive frequency fo to track the resonance frequency fr. More specifically, the VCO 202 changes the pulse width of the AC voltage Vo to change the drive frequency fo.

A reset circuit 102 is connected to a power supply line 104 extending from the low-pass filter 152 to VCO 202 to form a bypass path 106. The reset circuit 102 in the present embodiment is a PUT (Programmable Unijunction Transistor). When the phase difference indicating voltage Vt2 exceeds a predetermined threshold, the reset circuit 102 forcibly reduces the phase difference indicating voltage Vt2. At normal operation time, the reset circuit 102 does not function, and the phase difference indicating voltage Vt2 is equal to the phase difference indicating voltage Vt3 actually input to the VCO 202. The details of the reset circuit 102 and reason for providing the reset circuit 102 will be described later with regard to FIG. 7 and subsequent drawings.

Figure 2:
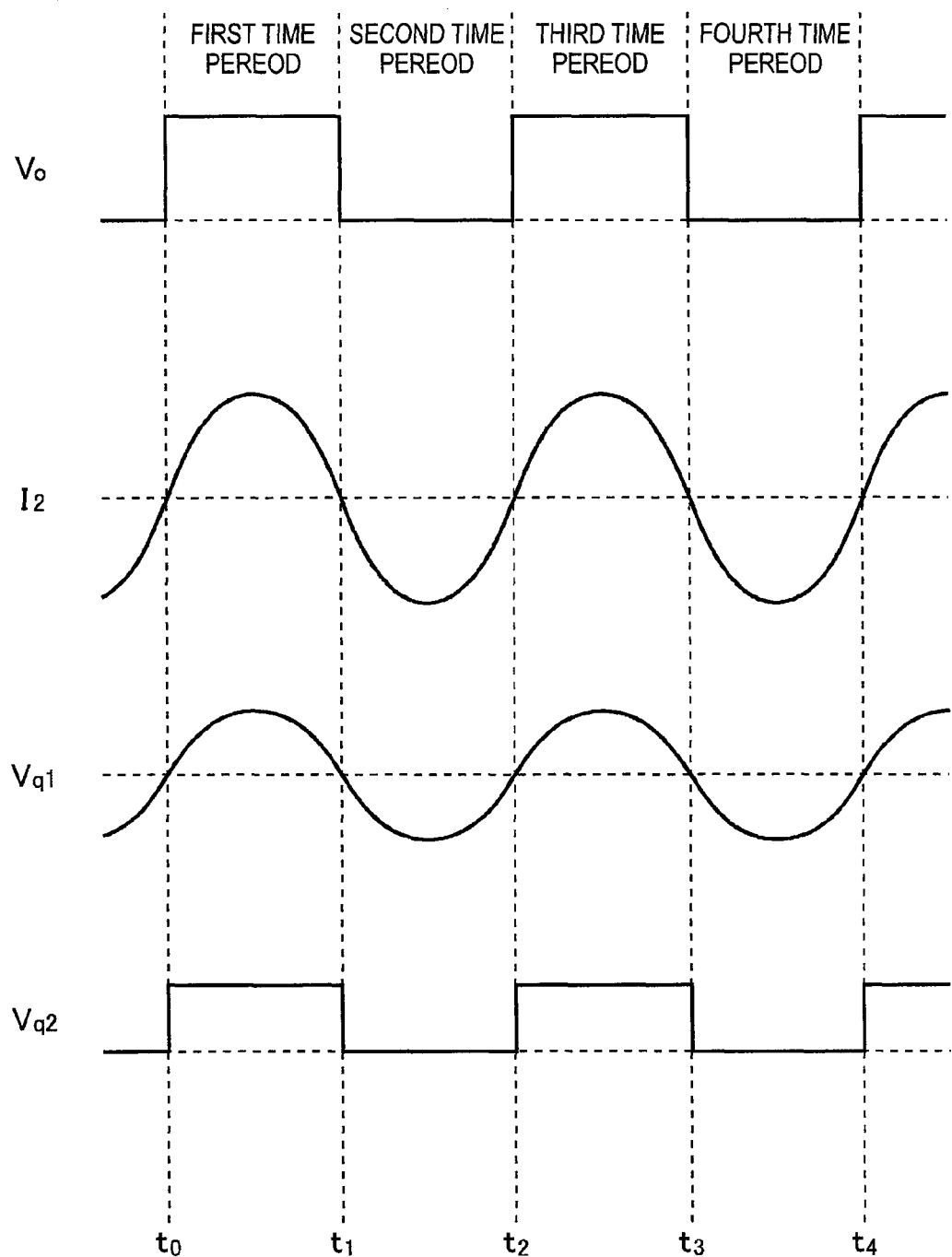
FIG. 2 is a time chart illustrating the voltage/current changing process observed in the case where the drive frequency and resonance frequency coincide with each other.

FIG. 2 is a time chart illustrating the voltage/current changing process observed in the case where the drive frequency fo and resonance frequency fr coincide with each other. Time period from time t0 to time t1 (hereinafter, referred to as "first time period") is a time period during which the switching transistor Q1 is ON while the switching transistor Q2 is OFF. Time period from time t1 to time t2 (hereinafter, referred to as "second time period") is a time period during which the switching transistor Q1 is OFF while the switching transistor Q2 is ON. Time period from time t2 to time t3 (hereinafter, referred to as "third time period") is a time period during which the switching transistor Q1 is ON while the switching transistor Q2 is OFF. Time period from time t3 to time t4 (hereinafter, referred to as "fourth time period") is a time period during which the switching transistor Q1 is OFF while the switching transistor Q2 is ON.

When the gate-source voltage VGS1 of the switching transistor Q1 exceeds a predetermined threshold, the switching transistor Q1 is in a saturated state. Thus, when the switching transistor Q1 is turned ON (conductive) at time t0 which is the start timing of the first time period, the source-drain current IDS1 starts flowing. In other words, the current IS starts flowing in the positive direction (the first current path). The current I2 having the same phase as that of the current IS starts flowing in the feeding coil circuit 120.

The potential Vq1 changes in synchronization with the current I2 (current IS). The potential Vq1 of an analog waveform is converted into voltage Vq2 of a digital waveform by the comparator 142 and diode 144.

When the switching transistor Q1 is turned OFF (non-conductive) at time t1 which is the start timing of the second time period, the source-drain current IDS1 does not flow. On the other hand, the switching transistor Q2 is turned ON (conductive), the source-drain current IDS2 starts flowing. That is, the current IS starts flowing in the negative direction (the second current path).

By observing the voltage waveform of Vq1, the current phase of current IS (the source-drain current IDS1 and IDS2) can be measured. In the third, fourth, and subsequent time periods, the same waveforms as in the first and second time periods are repeated.

The phase detection circuit 150 compares rising edge time t0 of the voltage Vo and rising edge time t0 of the voltage Vq2 to calculate the phase difference td. In the case of FIG. 2, the rising edge time t0 of the voltage Vo and rising edge time t0 of the voltage Vq2 coincide with each other, so that the phase difference td=0. That is, the drive frequency fo coincide with the resonance frequency fr. At this time, the phase detection circuit 150 does not change the phase difference indicating voltage Vt1.

The conversion (shaping) of the analog waveform of the potential Vq1 into digital waveform using the comparator 142, etc. makes it possible for the phase detection circuit 150 to easily detect the phase difference td. As a matter of course, the phase detection circuit 150 may detect the phase difference td by directly comparing the potential Vp0 and potential Vq1.

If the current I2 flowing in the feeding coil L2 is set as a measurement target as in the Patent Document 2, a new load is applied to the feeding coil circuit 120 to change the impedance Z of the feeding coil circuit 120, resulting in degradation of the Q-value. Connecting the phase detection circuit 150 to the current path of the resonating feeding coil L2 directly is like measuring the vibration of a tuning fork while touching the tuning fork. In the wireless power transmission system 100, the current phase is measured by generating the inductive current ISS using the magnetic field generated by the feeding coil L2. The measurement load is not applied to the feeding coil circuit 120, so that it is possible to measure the current phase while suppressing the influence on the Q-value.

It is possible to use not only the feeding coil L2 but also the receiving coil L3 or loading coil L4 as the primary coil to constitute a coupling transformer so as to cause the detection coil LSS to generate the inductive current ISS. According to the experiment made by the present inventor, it has been found out that the most satisfactory operation can be obtained in the case where the detection coil LSS is set for the feeding coil circuit 120.

Figure 3:
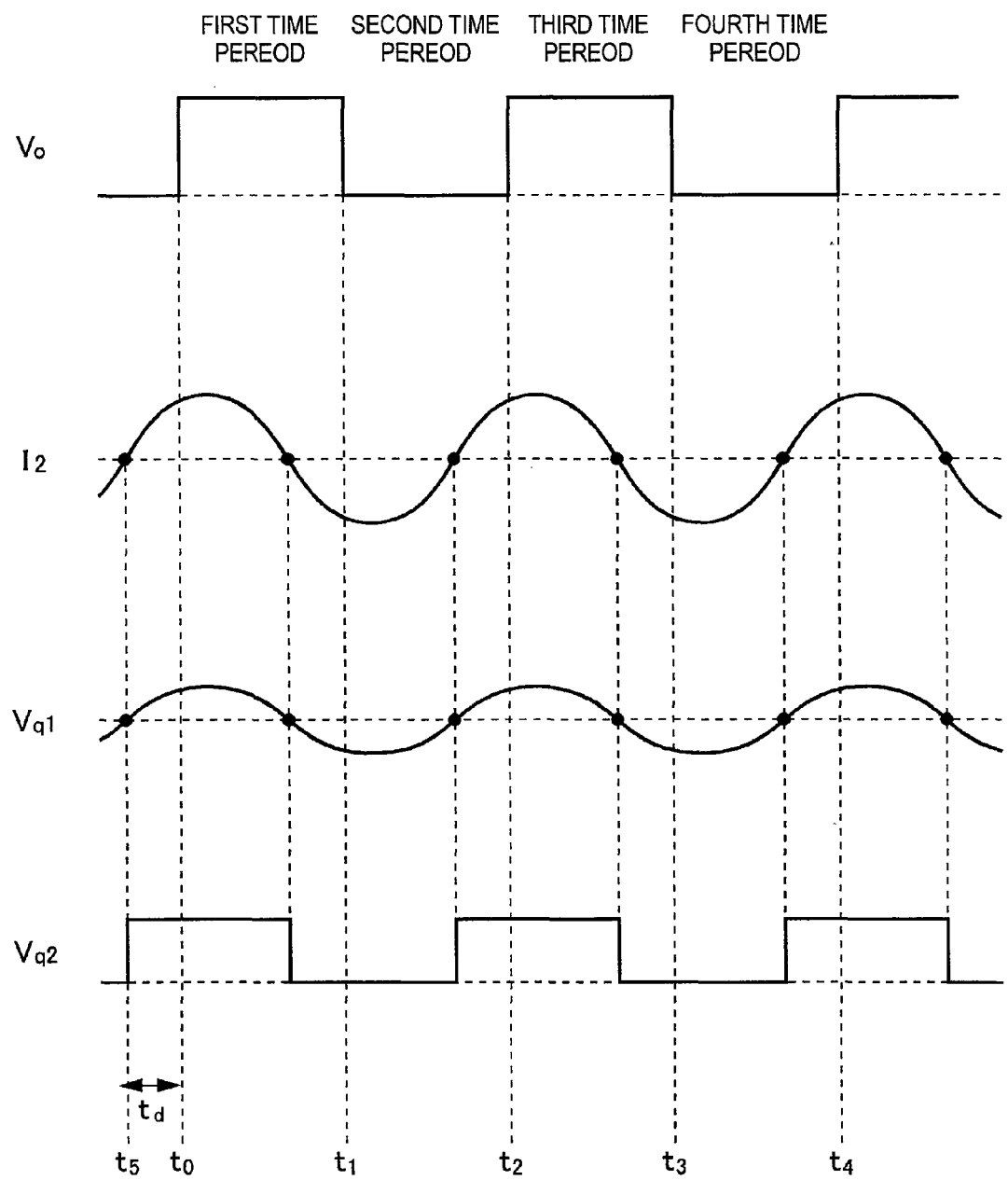
FIG. 3 is a time chart illustrating the voltage/current changing process observed in the case where the drive frequency is lower than the resonance frequency.

FIG. 3 is a time chart illustrating the voltage/current changing process observed in the case where the drive frequency fo is lower than the resonance frequency fr. In the case where the drive frequency fo is lower than the resonance frequency fr, a capacitive reactance component appears in impedance Z of the feeding coil circuit 120 (LC resonance circuit), and the current phase of the current IS advances with respect to the voltage phase. Thus, the current IS starts flowing at time t5 which is earlier than time t0. As described above, the current IS and potential Vq1 have the same phase, so that by comparing the voltage waveform of the potential Vo and voltage waveform of the potential Vq1, the phase difference td between the current phase and voltage phase in the supply power can be detected.

As illustrated in FIG. 2, when the drive frequency fo coincides with the resonance frequency fr, the current IS starts flowing at time t0 which is the start timing of the first time period, and the potential Vq1 becomes higher than 0. In this case, the phase difference td is 0. When the drive frequency fo is lower than the resonance frequency fr, the current IS starts flowing at time t5 which is earlier than time t0, and Vq1 becomes higher than 0, so that the phase difference td (=t0−t5) becomes more than 0. When the drive frequency fo and resonance frequency fr deviate from each other, the output power efficiency is degraded, and the amplitudes of the current IS and potential Vq1 becomes reduced as compared to those at the resonance time.

In the case where the drive frequency fo is higher than the resonance frequency fr, an inductive reactance component appears in the impedance Z of the feeding coil circuit 120, and the current phase of the current IS delays with respect to the voltage phase. In this case, the phase difference td is less than 0.

Figure 4:
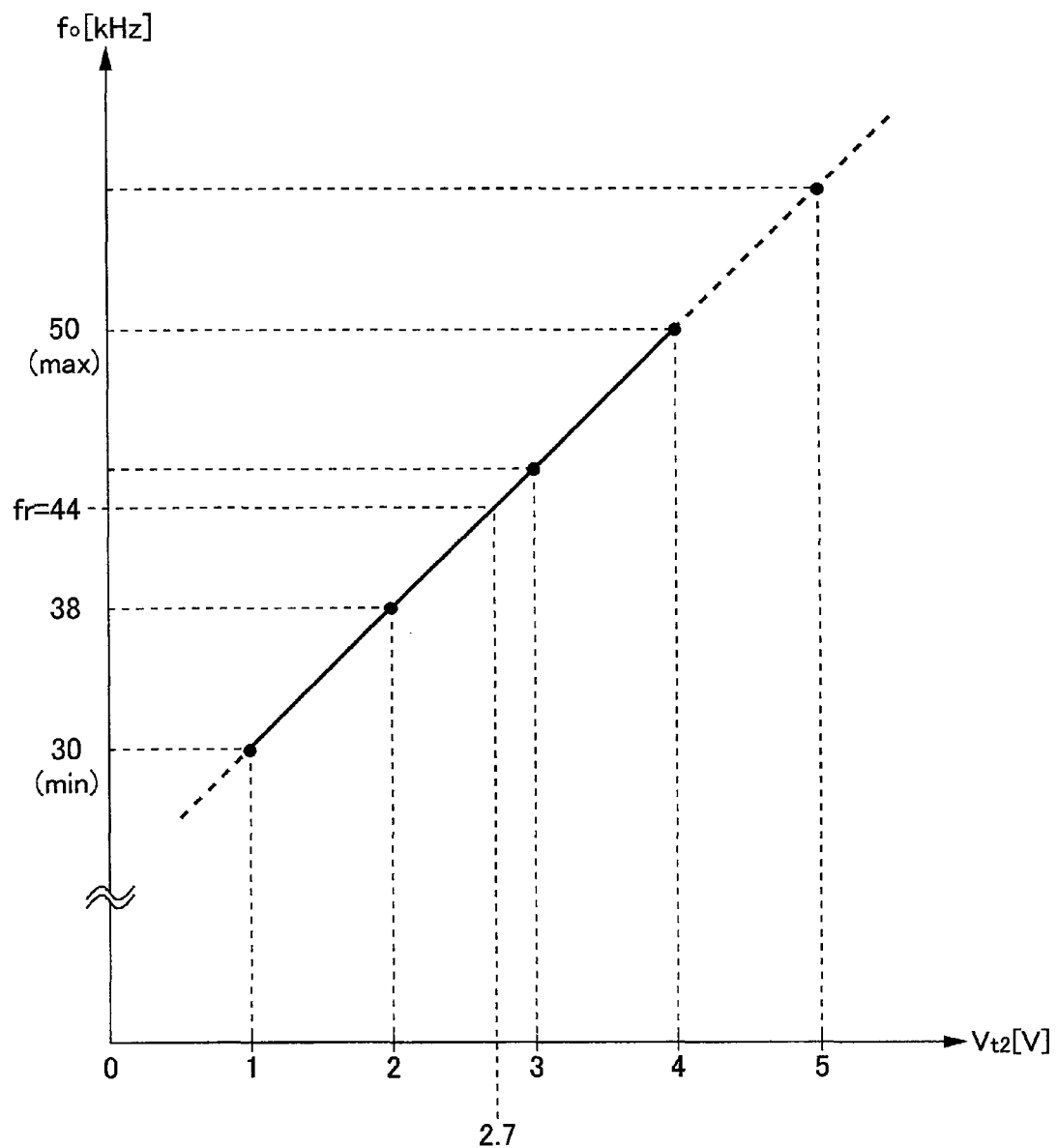
FIG. 4 is a graph illustrating a relationship between a phase difference indicating voltage and drive frequency.

FIG. 4 is a graph illustrating a relationship between the phase difference indicating voltage Vt2 and drive frequency fo. The relationship illustrated in FIG. 4 is set in the VCO 202. In this case, a description will be made assuming that the reset circuit 102 does not function and the phase difference indicating voltage Vt2 becomes the input voltage Vt3 input to the VCO 202.

The magnitude of the phase difference td is proportional to the variation of the resonance frequency fr. Thus, the phase detection circuit 150 determines the variation of the phase difference indicating voltage Vt2 in accordance with the phase difference td, and the VCO 202 determines the drive frequency fo in accordance with the phase difference indicating voltage Vt2. The settable range of the drive frequency fo is determined by the time constants of the resistors R5, R6 and capacitor C5 which are connected to the VCO 202. In the present embodiment, the settable range of the drive frequency fo is set in a range of 30 to 50 kHz. The resonance frequency fr is 44 kHz.

The resonance frequency fr is 44 kHz in the initial state and, accordingly, the drive frequency fo is set to 44 kHz. The corresponding phase difference indicating voltage Vt2 is assumed to be 2.7 (V). Assuming that the resonance frequency fr=drive frequency fo=44 kHz as illustrated in FIG. 2, the phase difference indicating voltage Vt2 is always 2.7 (V).

Assume that the resonance frequency fr is changed from 44 kHz to 38 kHz. Since the drive frequency fo (=44 kHz) is higher than the resonance frequency fr (=38 kHz) in this state, the phase difference td is less than 0. The phase difference td is proportional to the variation (−6 kHz) of the resonance frequency fr. The phase detection circuit 150 determines the variation of the phase difference indicating voltage Vt1 based on the phase difference td. In this example, the phase detection circuit 150 sets the variation of the phase difference indicating voltage Vt1 (phase difference indicating voltage Vt2) to −0.7 (V) and outputs new phase difference indicating voltage Vt1=2 (V). The VCO 202 outputs the drive frequency fo=38 kHz corresponding to the phase difference indicating voltage Vt1 (Vt2, Vt3)=2 (V) according to the relationship represented by the graph of FIG. 4. With the above processing, it is possible to allow the drive frequency fo to automatically track a change of the resonance frequency fr.

Figure 5:
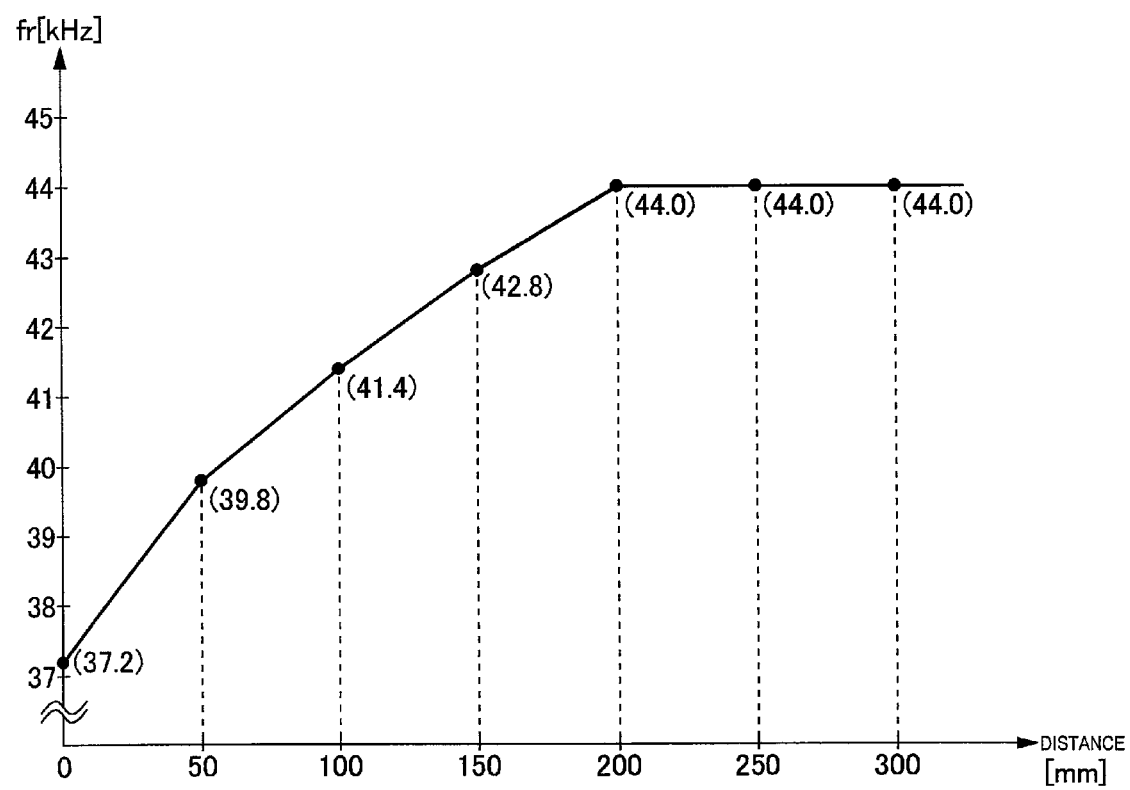
FIG. 5 is a graph illustrating a relationship between the distance between feeding and receiving coils and a resonance frequency.

FIG. 5 is a graph illustrating a relationship between the distance between the feeding coil L2 and receiving coil L3 and resonance frequency fr. According to the experiment made by the present inventor, it has been found that the resonance frequency fr is stable at 44 kHz when the distance between the feeding coil L2 and receiving coil L3 is 200 mm or more, while the resonance frequency fr starts falling when the distance between the coils L2 and L3 is made smaller than 200 mm. In the case of the present embodiment, the resonance frequency falls to 42.8 kHz, 41.4 kHz, and 39.8 kHz as the distance between the two coils, is reduced to 150 mm, 100 mm, and 50 mm. Finally, when the distance between the two coils is 0, the resonance frequency is 37.2 kHz. That is, when the feeding coil L2 and receiving coil L3 are sufficiently away from each other, the resonance frequency fr is stable at a fixed value regardless of the distance between the two coils, while when the feeding coil L2 and receiving coil L3 are brought close to each other to some extent, the resonance frequency fr falls. As described above, dependency of the resonance frequency fr on the distance between the coils has been found out.

Figure 6:
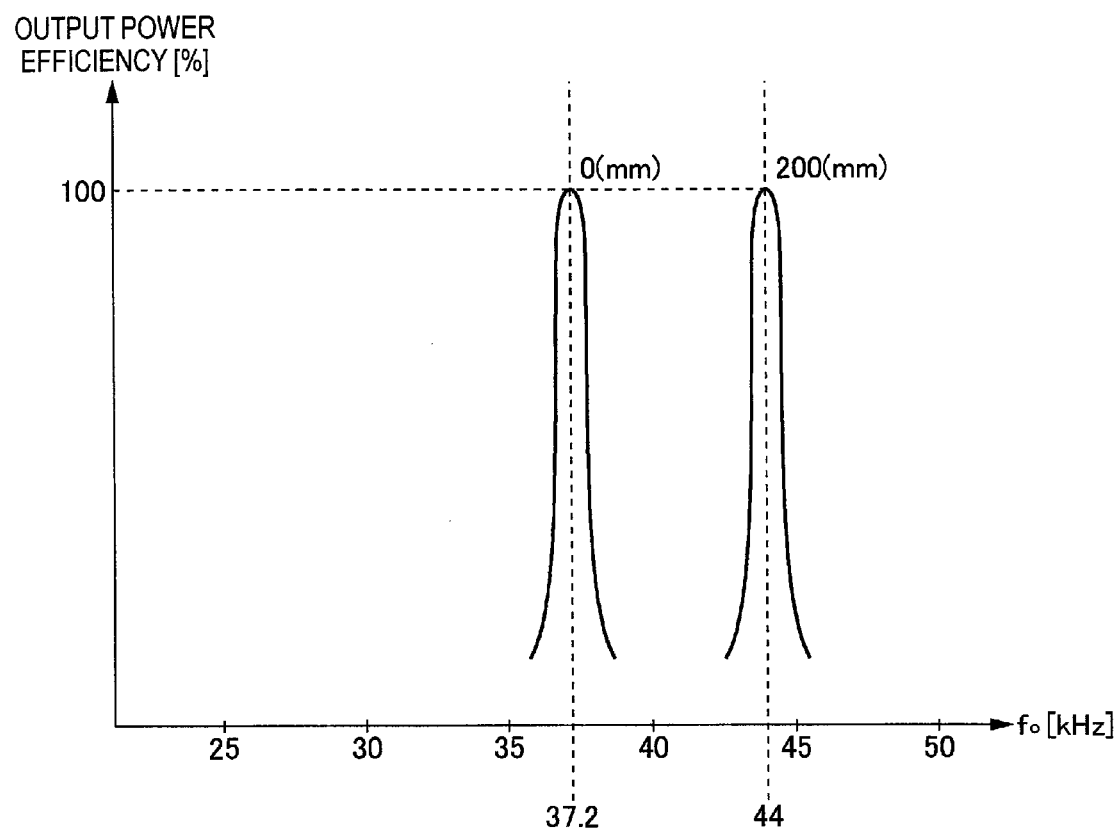
FIG. 6 is a graph illustrating a relationship between the output power efficiency and drive frequency.

FIG. 6 is a graph illustrating a relationship between the output power efficiency and drive frequency fo. The output power efficiency is a ratio of power actually fed from the feeding coil L2 relative to the maximum output value. When the drive frequency fo coincides with the resonance frequency fr, a difference between the current phase and voltage phase becomes zero and therefore the power transmission efficiency becomes maximum, with the result that output power efficiency of 100(%) can be obtained. The output power efficiency can be measured from the magnitude of power taken from the load LD.

When the distance between the coils is 200 mm, the output power efficiency is maximum at the drive frequency fo=44 kHz. When the distance between the coils is 0 mm, the output power efficiency is maximum at the drive frequency fo=37.2 kHz.

As described above, the resonance frequency fr changes also in the case where the distance between the coils is made small. Also in this case, the wireless power transmission system 100 can allow the drive frequency fo to track the resonance frequency fr. For example, the distance between a receiving coil buried in the lower part of the vehicle of an EV and feeding coil buried in the ground varies depending on the type of the vehicle, so that the resonance frequency fr may vary for each vehicle. According to the wireless power transmission system 100, the drive frequency fo can automatically be adjusted so as to obtain the maximum output power efficiency, so that wireless power feeding can be achieved with the maximum efficiency regardless of the vehicle type.

Figure 7:
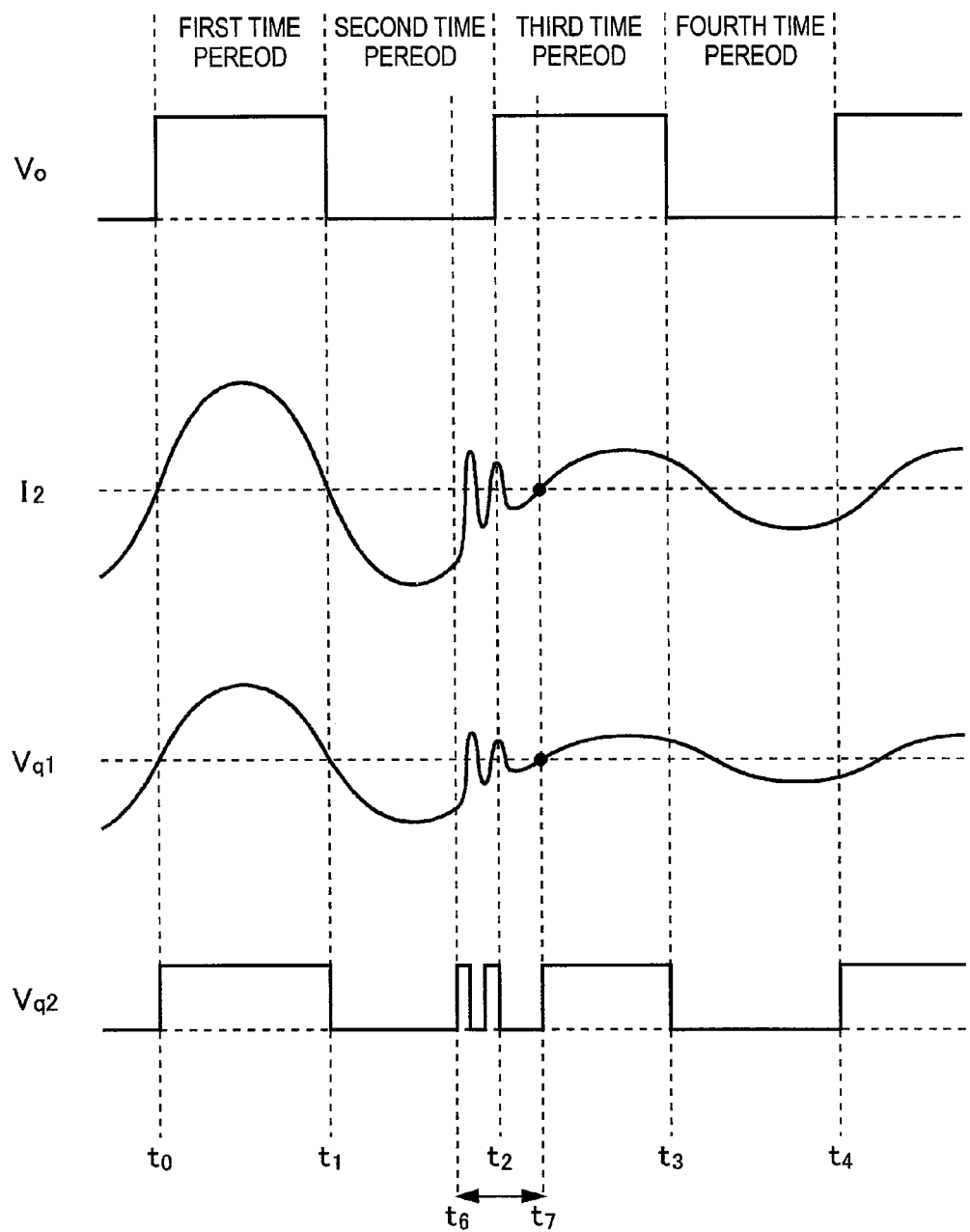
FIG. 7 is a time chart illustrating the voltage/current changing process observed in the case where temporary hunting occurs.

FIG. 7 is a time chart illustrating the voltage/current changing process observed in the case where temporary hunting occurs. A foreign matter such as iron passes between the feeding coil L2 and receiving coil L3, a system may go wrong temporarily. In FIG. 7, the drive frequency fo and resonance frequency fr coincide with each other during the first time period and until time t6 in the subsequent second time period, and hunting occurs at time t6. At this time, the waveform of the current I2 flowing in the feeding coil circuit 120 and waveform of the potential Vq1 synchronizing with the current I2 temporarily go up and down wildly. The distortions of the waveforms are shaped into pulse waves by the comparator 142, and the resultant pulse waves are transmitted to the phase detection circuit 150.

The phase detection circuit 150 falsely detects the phase difference td based on the potential Vq1 at the hunting time and changes the phase difference indicating voltage Vt1.

According to the experiment made by the present inventor, it has found that, at the time of occurrence of the hunting, the phase difference indicating voltage Vt1 is set almost certainly to the outputtable maximum value. The maximum value of the phase difference indicating voltage Vt1 in the present embodiment is 5 (V).

As is clear from the graph of FIG. 4, when the phase difference indicating voltage Vt3=5 (V) is input to the VCO 202, the drive frequency fo is set around 60 kHz. Since the actual resonance frequency fr is kept at 44 kHz, the drive frequency fo and resonance frequency fr abruptly deviate from each other. If the drive frequency fo and resonance frequency fr deviate from each other instantaneously, the drive frequency fo cannot be set back to an adequate value in some cases even after the time t7 at which the hunting ends. The result of the experiment reveals that the phase difference indicating voltage Vt1 is fixed to the maximum value 5 (V) after the time t7 and a phenomenon occurs in which the drive frequency tracking function does not function adequately afterward.

The reset circuit 102 is provided in the wireless power transmission system 100 in order to cope with such a newly found phenomenon.

Figure 8:
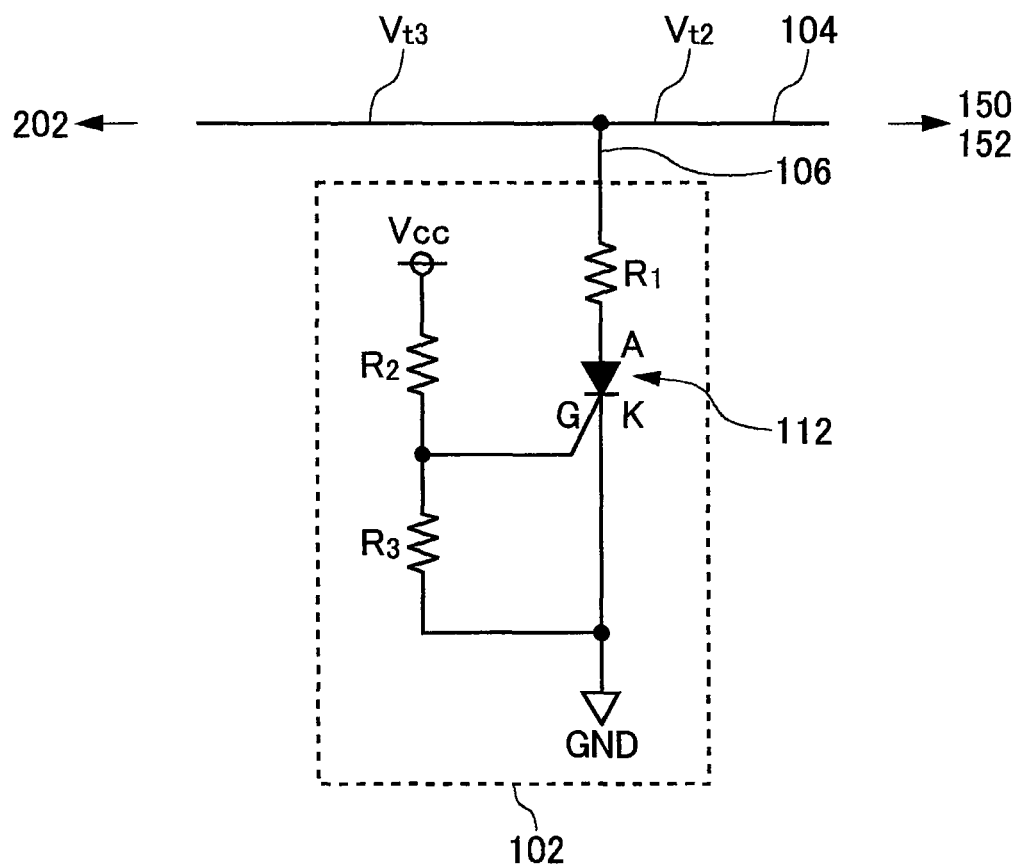
FIG. 8 is a circuit diagram of a reset circuit.

FIG. 8 is a circuit diagram of the reset circuit 102. The reset circuit 102 includes resistors R1 to R3 and a thyristor 112. The reset circuit 102 is connected to the power supply line 104 drawn from the low-pass filter 152 to form the bypass path 106. The bypass path 106 is extended from the power supply line 104 side, passed through the resistor R1 and thyristor 112, and is grounded.

Gate voltage VG obtained by divining power supply voltage VCC by the resistors R2 and R3 is applied to the gate G of the thyristor 112. The gate voltage VG is a fixed value. The anode A of the thyristor 112 is on the resistor R1 side, and the cathode K side thereof is on the ground side. The phase difference indicating voltage Vt2 is reduced across the resistor R1 and thereby anode potential VA is applied to the thyristor 112.

In general, the anode potential VA is not more than gate voltage VG. In this state, electric conduction is not provided between the anode and cathode of the thyristor 112. Therefore, current does not flow in the bypass path 106, so that the phase difference indicating voltage Vt2 passing through the low-pass filter 152 and phase difference indicating voltage Vt3 actually input to the VCO 202 are equal to each other.

When, e.g., at the time of occurrence of hunting, the phase difference indicating voltage Vt2 exceeds a predetermined value, e.g., 4 (V), the anode potential VA is more than gate potential VG. In this case, electric conduction is provided between the anode and cathode of the thyristor 112. Current flowing in the power supply line 104 flows into the bypass path 106, so that the potential (phase difference indicating voltage Vt2) of the power supply line 104 is rapidly reduced. For example, in the present embodiment, the potential of the power supply line 104 is reduced to 1.0 (V). In this case, the phase difference indicating voltage Vt3 input to the VCO 202 is 1.0 (V), so that the drive frequency fo is forcibly set to the minimum value of 30 kHz according to the relationship of FIG. 4. This operation is called "reset".

Once the drive frequency fo is set to a low frequency, the drive frequency adjustment functions of the phase detection circuit 150 and VCO 202 function again to make the drive frequency fo coincide with the resonance frequency fr. The VCO 202 increases the drive frequency fo by gradually increasing the frequency of pulse change of the AC voltage Vo. That is, the drive frequency fo sweeps from 30 kHz (minimum value) toward 50 kHz (maximum value). In this sweep process, the drive frequency fo is made coincide with the resonance frequency fr (=44 kHz).

That is, an experiment has revealed that it is difficult to make the drive frequency fo coincide with the resonance frequency fr once again when the drive frequency fo is set to a high-frequency by some external factor. In this case, forcibly setting the drive frequency fo to a low frequency using the reset circuit 102 makes it easy to make the drive frequency fo coincide with the resonance frequency fr. Providing the reset circuit 102 makes it easier to respond to an unexpected trouble, whereby operation stability of the wireless power transmission system 100 is further enhanced.

Figure 9:
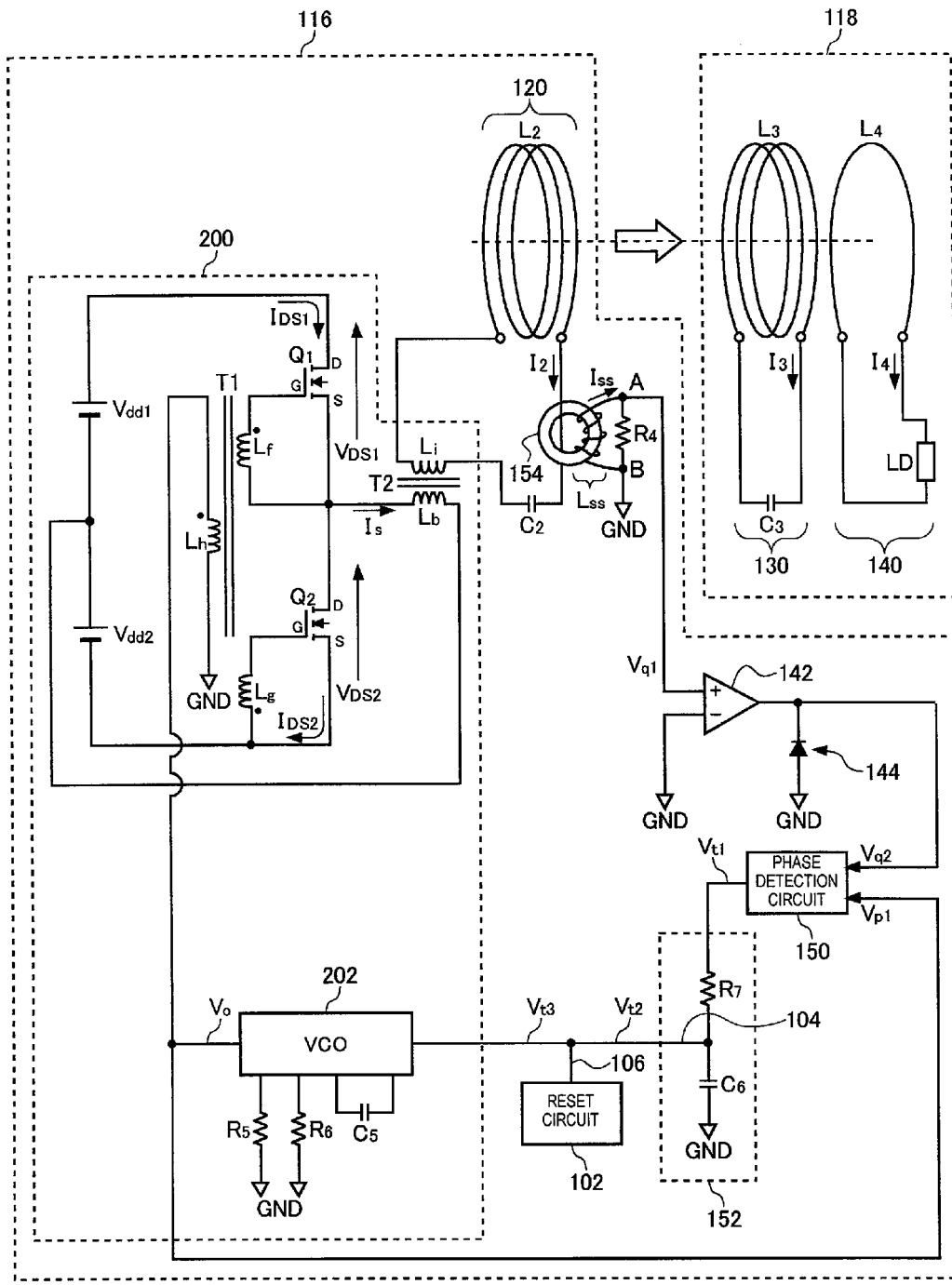
FIG. 9 is a system configuration view of the wireless power transmission system which is a modification of the first embodiment.

FIG. 9 is a system configuration view of a wireless power transmission system 100 which is a modification of the first embodiment. In the wireless power transmission system 100 of the modification, the power transmission control circuit 200 directly drives the feeding coil circuit 120 without intervention of the exciting circuit 110. Components designated by the same reference numerals as those of FIG. 1 have the same or corresponding functions as those in FIG. 1.

The feeding coil circuit 120 in the modification is a circuit in which the transformer T2 secondary coil Li is connected in series to the feeding coil L2 and capacitor C2. The transformer T2 secondary coil Li constitutes a coupling transformer T2 together with the transformer T2 primary coil Lb and receives AC power from the power transmission control circuit 200 by electromagnetic induction. Thus, the AC power may be directly fed from the power transmission control circuit 200 to the feeding coil circuit 120 without intervention of the exciting circuit 110.

Second Embodiment

Push-Pull Type

Figure 10:
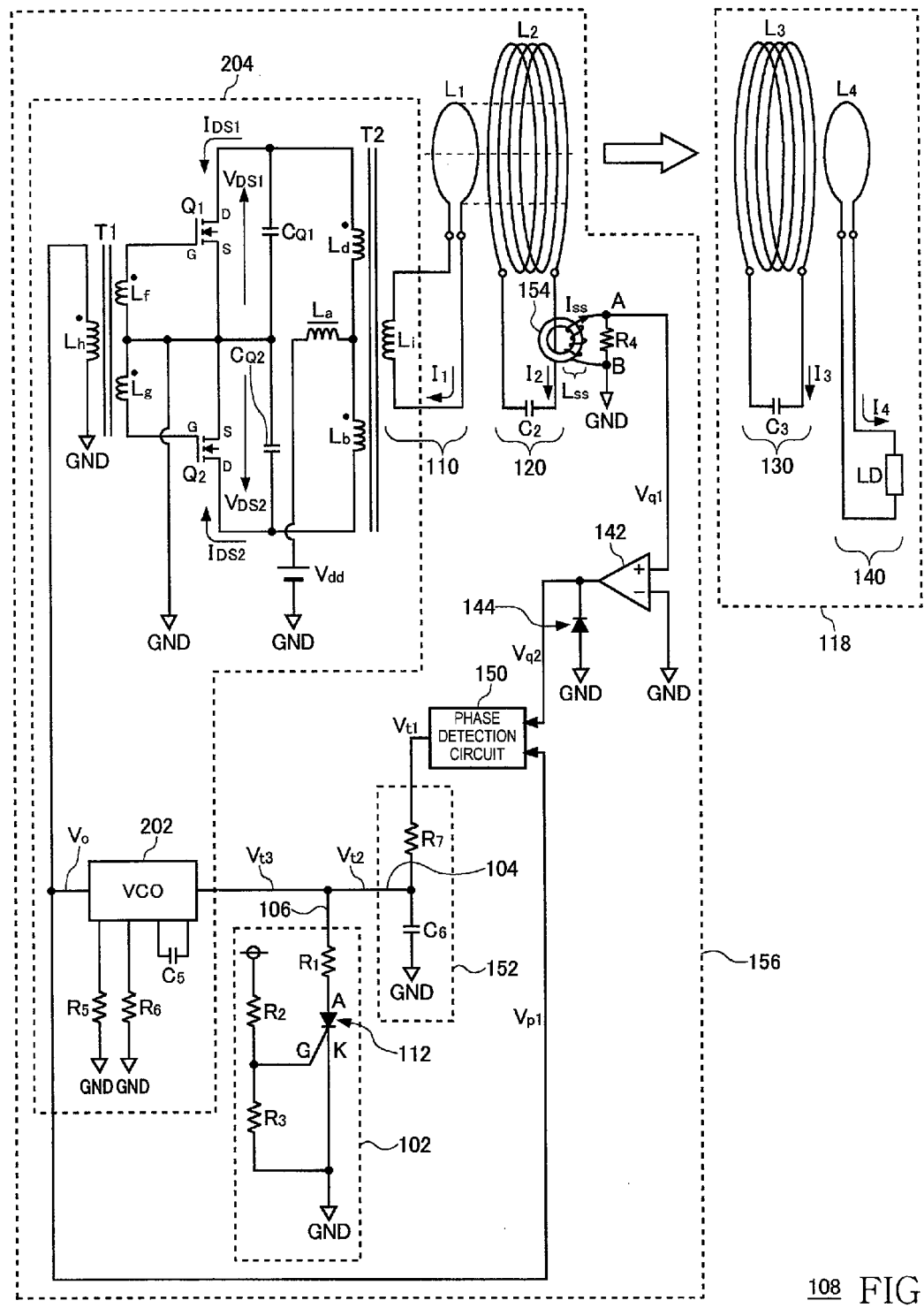
FIG. 10 is a system configuration view of the wireless power transmission system according to a second embodiment.

FIG. 10 is a system configuration view of a wireless power transmission system 108 according to a second embodiment. The wireless power transmission system 108 includes a wireless power feeder 156 and a wireless power receiver 118. The wireless power feeder 156 includes, as basic components, a power transmission control circuit 204, an exciting circuit 110, and a feeding coil circuit 120. A distance of several meters is provided between the feeding coil circuit 120 and receiving coil circuit 130. As in the case of the first embodiment, the wireless power transmission system 108 mainly aims to feed power from the feeding coil circuit 120 to receiving coil circuit 130. Components designated by the same reference numerals as those of FIGS. 1 and 8 have the same or corresponding functions as those described above.

The exciting circuit 110 is a circuit in which an exciting coil L1 and a transformer T2 secondary coil Li are connected in series. The exciting circuit 110 receives AC power from the power transmission control circuit 204 through the transformer T2 secondary coil Li. The transformer T2 secondary coil Li constitutes a coupling transformer T2 together with a transformer T2 primary coil Ld and a transformer T2 primary coil Lb of the power transmission control circuit 204 and receives AC power by electromagnetic induction. The number of windings of the exciting coil L1 is 1, cross-sectional shape of a coil conductor thereof is a rectangle of 0.6 mm×6.0 mm, and shape of the exciting coil L1 itself is a square of 210 mm×210 mm. Current I1 flowing in the exciting circuit 110 is AC. The direction of an arrow in the diagram of the exciting circuit 110 indicates the positive direction, and direction opposite to the direction of the arrow indicates the negative direction.

The feeding coil circuit 120 has the same configuration as that of the feeding coil circuit 120 of the first embodiment and is a circuit resonating at a resonance frequency fr of 44 kHz. The configurations of the receiving coil circuit 130 and loading circuit 140 are the same as those in the first embodiment.

The power transmission control circuit 204 is a push-pull circuit operating at a drive frequency fo and has a vertically symmetrical configuration as illustrated in FIG. 10. The exciting circuit 110 receives AC power at the drive frequency fo from the power transmission control circuit 204. In this case, the currents I1 to I4 at the drive frequency fo flow in the exciting circuit 110, feeding coil circuit 120, receiving coil circuit 130, and loading circuit 140. When the drive frequency fo and resonance frequency fr coincide with each other, that is, when the drive frequency fo assumes 44 kHz, the feeding coil circuit 120 and receiving coil circuit 130 magnetically resonate, maximizing the power transmission efficiency.

A VCO 202 is connected to the primary side of the gate-drive transformer T1 included in the power transmission control circuit 204. The AC voltage Vo generated by the VCO 202 causes current to flow in a transformer T1 primary coil Lh alternately in both positive and negative directions. A transformer T1 primary coil Lh, a transformer T1 secondary coil Lf, and a transformer T1 secondary coil Lg constitute a gate-drive coupling transformer T1. Electromagnetic induction causes current to flow also in a transformer T1 secondary coil Lg and the transformer T1 primary coil Lh alternately in both positive and negative directions.

The secondary coil of the transformer T1 is center-point grounded. That is, one ends of the transformer T1 secondary coil Lf and transformer T1 secondary coil Lg are connected to each other and directly grounded. The other end of the transformer T1 secondary coil Lf is connected to the gate of a switching transistor Q1, and the other end of the transformer T1 secondary coil Lg is connected to the gate of a switching transistor Q2. The source of the switching transistor Q1 and source of the switching transistor Q2 are also grounded. Thus, when the oscillator 202 generates AC voltage of the drive frequency fo, voltage Vx (Vx>0) of the drive frequency fo is applied alternately to the gates of the switching transistors Q1 and Q2. As a result, the switching transistors Q1 and Q2 are alternately turned on/off at the drive frequency fo.

The drain of the switching transistor Q1 is connected in series to a transformer T2 primary coil Ld. Similarly, the drain of the switching transistor Q2 is connected in series to a transformer T2 primary coil Lb. A smoothing inductor La and a power supply Vdd are connected to the connection point between the transformer T2 primary coil Ld and transformer T2 primary coil Lc. Further, a capacitor CQ1 is connected in parallel to the source-drain of the switching transistor Q1, and a capacitor CQ2 is connected in parallel to the source-drain of the switching transistor Q2.

The capacitor CQ1 is inserted so as to shape the voltage waveform of the source-drain voltage VDS1, and capacitor CQ2 is inserted so as to shape the voltage waveform of the source-drain voltage VDS2. Even if the capacitors CQ1 and CQ2 are omitted, the wireless power feeding using the power transmission control circuit 204 can be achieved. In particular, in the case where the drive frequency fo is low, it is easily possible to maintain the power transmission efficiency even if the capacitors are omitted.

The input impedance of the exciting circuit 110 is 50(Ω). The number of windings of the transformer T2 primary coil Lb and the number of windings of the transformer T2 primary coil Ld are set such that the output impedance of the power transmission control circuit 204 is equal to the input impedance of 50(Ω). When the output impedance of the power transmission control circuit 204 and input impedance of the exciting circuit 110 coincide with each other, the power transmission control circuit 204 has the maximum output.

When the switching transistor Q1 is turned conductive (ON), the switching transistor Q2 is turned non-conductive (OFF). A main current path, "first current path", at this time is from the power supply Vdd through the smoothing inductor La, transformer T2 primary coil Ld, and switching transistor Q1 to the ground. The switching transistor Q1 functions as a switch for controlling conduction/non-conduction of the first current path.

When the switching transistor Q2 is turned conductive (ON), the switching transistor Q1 is turned non-conductive (OFF). A main current path, "second current path", at this time is from the power supply Vdd through the smoothing inductor La, transformer T2 primary coil Lb, and switching transistor Q2 to the ground. The switching transistor Q2 functions as a switch for controlling conduction/non-conduction of the second current path.

When the VCO 202 feeds the AC voltage Vo at the resonance frequency fr, the first and second current paths are switched at the resonance frequency fr. The AC current I1 flows in the exciting circuit 110 at the resonance frequency fr, and the AC current I2 of the resonance frequency fr flows in the feeding coil circuit 120. Thus, the feeding coil L2 of the feeding coil circuit 120 and capacitor C2 are in a resonance state. The receiving coil circuit 130 is also a resonance circuit of the resonance frequency fr, so that the feeding coil L2 and receiving coil L3 magnetically resonate. At this time, the maximum transmission efficiency can be obtained.

Also in the wireless power transmission system 108, the voltage phase is measured from the potential Vo. In the second embodiment, a detection coil LSS is provided on the feeding coil circuit 120 side, and a part of the feeding coil circuit 120 and detection coil LSS constitute a coupling transformer. Inductive current ISS is made to flow in the detection coil LSS by a magnetic field generated by AC current I2. The current phase is measured based on the inductive current ISS according to the same method as the first embodiment. The phase difference td between the current phase and voltage phase is detected by the phase detection circuit 150, and the phase difference indicating voltage Vt1 is generated, and VCO 202 adjusts the drive frequency fo, thereby maintaining the resonance state.

It is possible to use not only the feeding coil circuit 120 but also the exciting circuit 110, receiving coil circuit 130, or loading circuit 140 as the primary coil side to constitute a coupling transformer so as to cause the detection coil LSS to generate the inductive current ISS.

Figure 11:
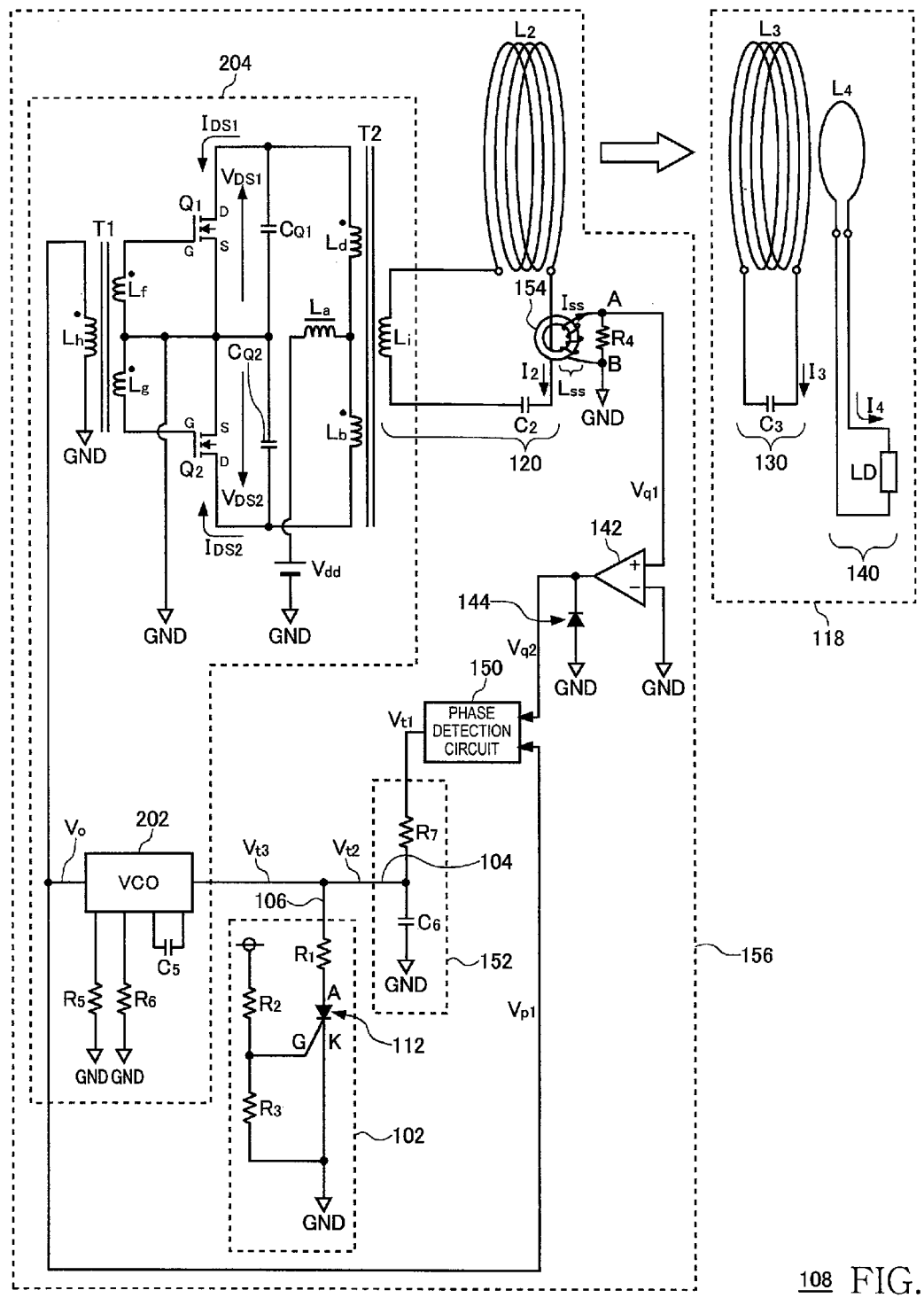
FIG. 11 is a system configuration view of the wireless power transmission system which is a modification of the second embodiment.

FIG. 11 is a system configuration view of a wireless power transmission system 108 which is a modification of the second embodiment. In the wireless power transmission system 108 of the modification, the power transmission control circuit 204 directly drives the feeding coil circuit 120 without intervention of the exciting circuit 110. Components designated by the same reference numerals as those of FIG. 10 have the same or corresponding functions as those in FIG. 10.

The feeding coil circuit 120 in the modification is a circuit in which the transformer T2 secondary coil Li is connected in series to the feeding coil L2 and the capacitor C2. The transformer T2 secondary coil Li constitutes a coupling transformer T2 together with the transformer T2 primary coils Lb and Ld and receives AC power from the power transmission control circuit 200 by electromagnetic induction. Thus, the AC power may be directly fed from the power transmission control circuit 200 to the feeding coil circuit 120 without intervention of the exciting circuit 110.

As in the first embodiment, even if the phase difference indicating voltage Vt2 is locked to the maximum value in the second embodiment, this locked state can be released by the reset circuit 102.

The wireless power transmission systems 100 and 108 have been described based on the respective embodiments. The exciting coil L1, feeding coil L2, receiving coil L3, and loading coil L4 resonate at the same resonance frequency fr, so that if some load is connected to these coils, the Q-value reacts with high sensitivity. In the present embodiment, the AC current itself to be fed is not set as a measurement target, but the inductive current ISS is generated by the AC magnetic field generated at the time of power feeding to measure the current phase, making it easy to suppress the influence on the system's resonance characteristics (Q-value).

In the case of wireless power feeding of the magnetic field resonance type, the coincidence degree between the resonance frequency fr and drive frequency fo gives great influence on the power transmission efficiency. Providing the phase detection circuit 150 and VCO 202 or the like allows the drive frequency fo to automatically track a change of the resonance frequency fr, making it easy to maintain the power transmission efficiency at its maximum value even if use conditions are changed.

Further, even if the drive frequency fo and resonance frequency fr instantaneously deviate from each other due to the occurrence of temporary hunting, the drive frequency fo can forcibly set to a low frequency by the reset circuit 102. Thus, it is possible to dissolve the deviation between the drive frequency fo and resonance frequency fr more easily.

The above embodiments are merely illustrative of the present invention and it will be appreciated by those skilled in the art that various modifications may be made to the components of the present invention and a combination of processing processes and that the modifications are included in the present invention.

What is claimed is:

1. A wireless power feeder for feeding power by wireless from a feeding coil to a receiving coil at the resonance frequency of the feeding coil and receiving coil, comprising:
   a power transmission control circuit;
   the feeding coil;
   an exciting coil that is magnetically coupled to the feeding coil and feeds AC power fed from the power transmission control circuit to the feeding coil;
   a phase detection circuit that detects the phase difference between the voltage phase and current phase of the AC power and generates a phase difference indicating voltage in accordance with the magnitude of the phase difference; and
   a reset circuit that is connected to a voltage line to which the phase difference indicating voltage is fed so as to reduce the phase difference indicating voltage, wherein
   the transmission power control circuit includes first and second current paths and makes first and second switches connected in series respectively to the first and second current paths alternately conductive to feed the AC power to the exciting coil,
   the phase difference indicating voltage output from the phase detection circuit is input to the power transmission control circuit,
   the power transmission control circuit adjusts the drive frequency so as to reduce the phase difference according to the phase difference indicating voltage to allow the drive frequency to track the resonance frequency, and the reset circuit reduces the phase difference indicating voltage when the phase difference indicating voltage exceeds a predetermined threshold.

2. The wireless power feeder as claimed in claim 1, wherein a bypass path is connected to a voltage line extending from the phase detection circuit to power transmission control circuit, and
   the reset circuit makes a switch inserted in the bypass path conductive to reduce the phase difference indicating voltage.

3. The wireless power feeder as claimed in claim 1, wherein the higher the phase difference indicating voltage, the further the power transmission control circuit increases the drive frequency.

4. The wireless power feeder as claimed in claim 1, wherein a low-pass filter is connected to the output end of the phase detection circuit.

5. The wireless power feeder as claimed in claim 4, wherein the low-pass filter is a circuit in which a resistor and a capacitor are connected in series to each other, and
   the reset circuit is connected to a voltage line drawn from the intermediate point between the resistor and capacitor.

6. The wireless power feeder as claimed in claim 1, further comprising a detection coil that generates inductive current using a magnetic field generated by the AC current, wherein the phase detection circuit measures the phase of the inductive current flowing in the detection coil to achieve measurement of the current phase of the AC power.

7. The wireless power feeder as claimed in claim 6 wherein the detection coil is a coil that generates the inductive current using a magnetic field generated by the AC power flowing in the feeding coil.

8. A wireless power transmission system comprising:
   a wireless power feeder as claimed in claim 1;
   the receiving coil; and
   a loading coil that is magnetically coupled to the receiving coil and receives power that the receiving coil has received from the feeding coil.

9. A wireless power feeder for feeding power by wireless from a feeding coil to a receiving coil at the resonance frequency of the feeding coil and receiving coil, comprising:
   a power transmission control circuit that feeds AC power to the feeding coil at the drive frequency;
   a feeding coil circuit that includes the feeding coil and a capacitor and resonates at the resonance frequency;
   a phase detection circuit that detects the phase difference between the voltage phase and current phase of the AC power and generates a phase difference indicating voltage in accordance with the magnitude of the phase difference; and
   a reset circuit that is connected to a voltage line to which the phase difference indicating voltage is fed so as to reduce the phase difference indicating voltage, wherein
   the power transmission control circuit includes first and second current paths and makes first and second switches connected in series respectively to the first and second current paths alternately conductive to feed the AC power to the feeding coil,
   the phase difference indicating voltage output from the phase detection circuit is input to the power transmission control circuit,
   the power transmission control circuit adjusts the drive frequency so as to reduce the phase difference according to the phase difference indicating voltage to allow the drive frequency to track the resonance frequency, and the reset circuit reduces the phase difference indicating voltage when the phase difference indicating voltage exceeds a predetermined threshold.

10. The wireless power feeder as claimed in claim 9, wherein
a bypass path is connected to a voltage line extending from the phase detection circuit to power transmission control circuit, and
the reset circuit makes a switch inserted in the bypass path conductive to reduce the phase difference indicating voltage.

11. The wireless power feeder as claimed in claim 9, wherein
the higher the phase difference indicating voltage, the further the power transmission control circuit increases the drive frequency.

12. The wireless power feeder as claimed in claim 9, wherein
a low-pass filter is connected to the output end of the phase detection circuit.

13. The wireless power feeder as claimed in claim 9, further comprising a detection coil that generates inductive current using a magnetic field generated by the AC current, wherein
the phase detection circuit measures the phase of the inductive current flowing in the detection coil to achieve measurement of the current phase of the AC power.

14. The wireless power feeder as claimed in claim 13 wherein
the detection coil is a coil that generates the inductive current using a magnetic field generated by the AC power flowing in the feeding coil.

15. A wireless power transmission system comprising:
a wireless power feeder as claimed in claim 9;
the receiving coil; and
a loading coil that is magnetically coupled to the receiving coil and receives power that the receiving coil has received from the feeding coil.

* * * * *